Sept. 17, 1935.  J. E. WATSON  2,014,996
PASSENGER BUS SEATING ARRANGEMENT
Filed Sept. 5, 1933   2 Sheets-Sheet 1
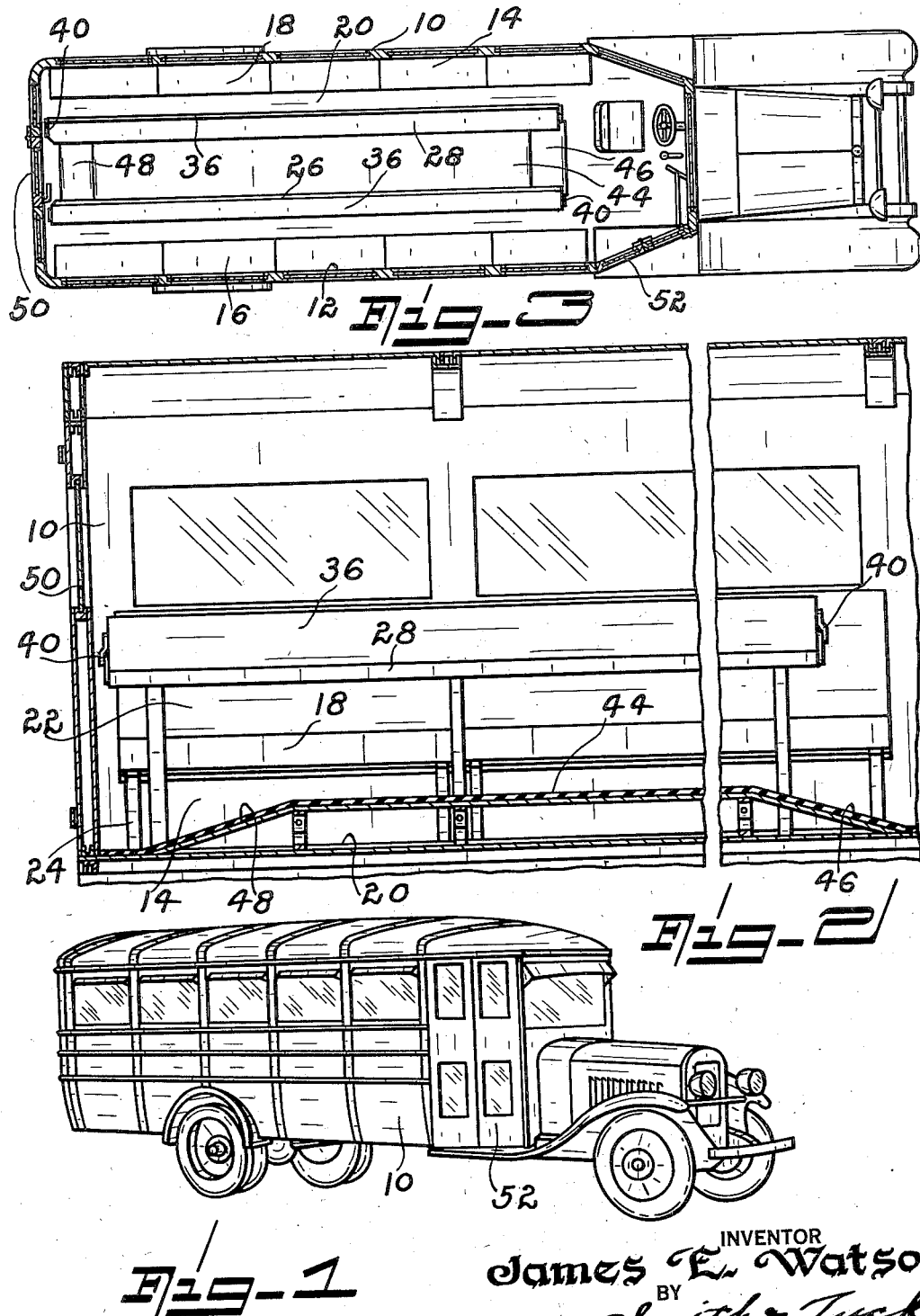

Sept. 17, 1935.  J. E. WATSON  2,014,996
PASSENGER BUS SEATING ARRANGEMENT
Filed Sept. 5, 1933   2 Sheets-Sheet 2
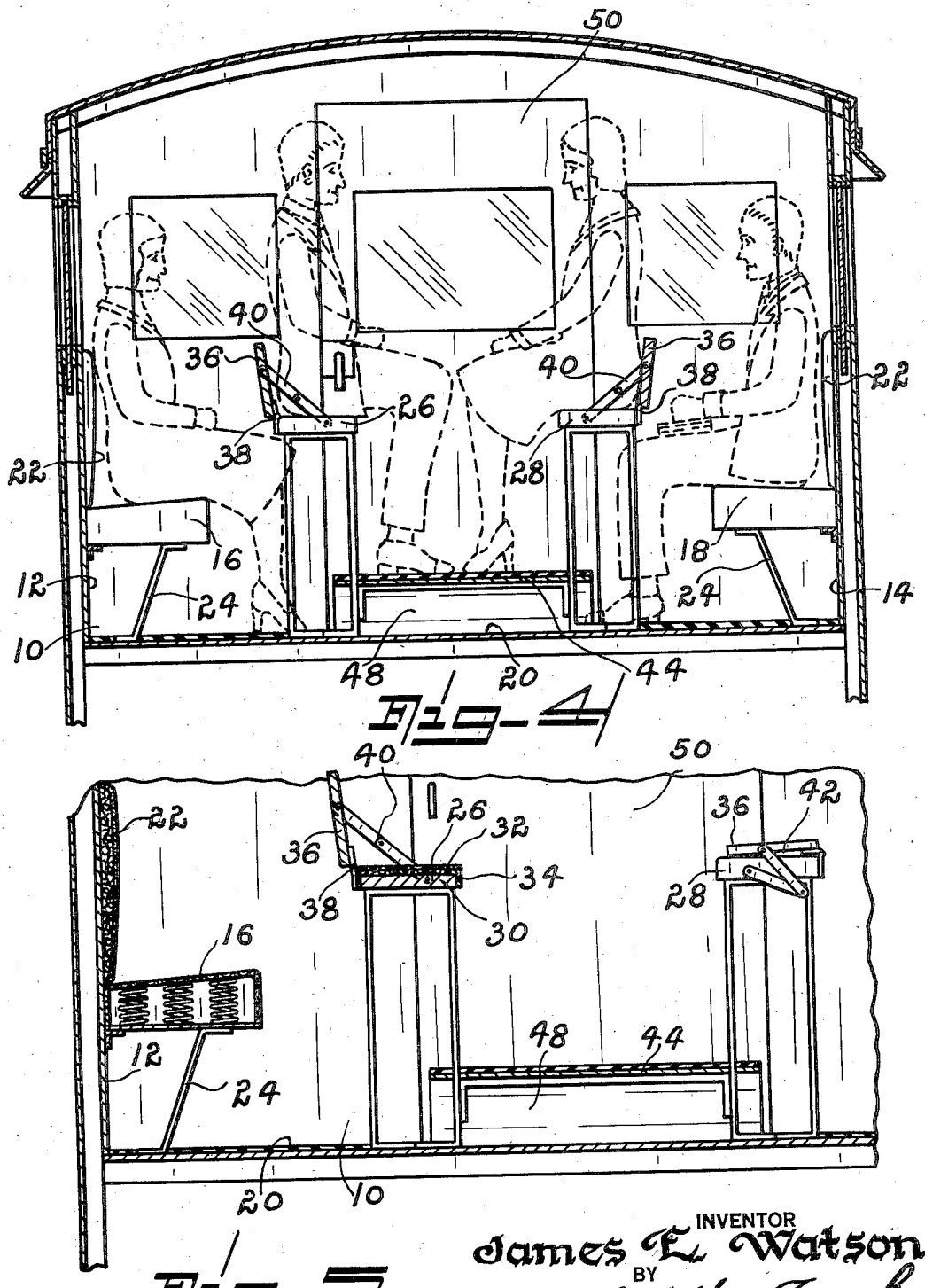

Patented Sept. 17, 1935

2,014,996

UNITED STATES PATENT OFFICE 2,014,996

PASSENGER BUS SEATING ARRANGEMENT

James E. Watson, Kirkland, Wash.

Application September 5, 1933, Serial No. 688,229

2 Claims. (Cl. 296—64)

My present invention relates to the art of automotive bodies and more particularly to a passenger bus seating arrangement.

Since the universal adoption of motor buses as a means for transporting passengers there have been created many different seating arrangements, each intended for a specific purpose. Consequently in my present showing I have provided a seating arrangement for a specific purpose but one which with suitable modifications might be usable for still other purposes. In order to more clearly explain my present arrangement however I prefer to describe it as relating to a school bus.

Following the principles of my invention it is possible to seat with comfort 60 children of high school ages in a bus body having an overall length of only 21 feet 2 inches.

It is to meet conditions of this character that I have provided my novel seating arrangement.

The principal object of my present invention is therefore to provide the maximum seating facilities within a given sized vehicle.

A further object is the provision of means whereby two seats or rows of seats are raised above other parallel rows so that the knees of one group of sitters may be slightly under the upper seat thus giving maximum seating capacity within a minimum width of truck body.

A further object is the provision of means which permits of greater speed in loading and unloading passengers from a motor truck.

A further object of my invention is to provide for a rapid discharge of passengers from either end of the vehicle partly as a matter of convenience and secondly as a matter of safety.

A further object of my invention is to provide a seating arrangement in which when all the seats are filled there is no standing room available and therefore there can be no overloading of the vehicle.

Other and more specific objects will be apparent from the following description taken in connection with the accompanying drawings, wherein Figure 1 is a perspective view showing the type of motor bus which is adaptable to my present plan and arrangement. Figure 2 is a longitudinal view thru the body of a truck built after the showing of Figure 1. Figure 3 is a horizontal sectional view thru such a truck body. Figure 4 is a cross sectional view thru a body made after my principles showing the position of passenger in dotted lines. Figure 5 is a fragmentary cross-sectional view to show greater detail of construction.

Referring to the drawings, throughout which like reference characters indicate like parts, 10 designates in general the body of a motor bus suitable for use with my seating arrangement. It is desirable that the body be of fair width and will be of such a height that ample clearance is provided so that persons can walk in the body standing fully erect. I then provide within body 10 a plurality of longitudinally disposed seats. These may be long continuous seats or they may be made up of a number of more or less individual seats. It is normally most practical to form particularly the side seats, which should be provided with spring cushions, into lengths such as would normally seat two or three passengers. However, it will be apparent it is believed that individual seats might be used if conditions should so dictate. The two longitudinal seats that abut the opposite walls 12 and 14, as 16 and 18 respectively, should be arranged so that the upper surfaces of the seats are the normal sitting height above the truck floor 20. These should normally be provided with padded back rests as 22 to add to the comfort of the passengers. It is particularly desirable that the supporting means for these seats will be arranged so that the seats will be somewhat cantilevered, as illustrated in Figure 5, by having the support members 24 sloping backwardly and not coming clear to the outer edge of the cushions thereby permitting greater freedom of movement in the necessarily restricted aisleway.

Disposed at a higher level than cushions 16 and 18, are additional seats arranged for seating passengers facing toward the center after the showing of Figure 4 with the backs of the passengers using the raised seat toward the closer walls of the truck. The exact height of the various seats will of necessity be regulated by the average height of the passengers transported. I have found that for high school students, the outer edges of cushions 16 and 18 are best when approximately 16 inches from the floor 20, then a satisfactory height for the centrally disposed seats will be about 25 inches. This height should be increased if the relative thickness of the longitudinal seats as 26 and 28 is increased. In the illustrations I have shown seats arranged with preferably wood base members 30 upon which padding is secured as 32 which in turn is covered by a suitable fabric as 34.

I wish it to be clearly understood that while in the showing as illustrated a height of 25 inches to the upper surface of seats 26 and 28 is found satisfactory, if spring cushion seats were employed instead of the padded seats illustrated that the height would necessarily need to be increased, inasmuch as the knees of the passengers using seats 16 and 18 must have sufficient clearance so that they can extend slightly underneath seats 26 and 28.

In the illustrations I have shown foldable back rests as 36 which are hingedly secured to the seats at 38 and are supported in the raised position by suitable means as the folding linkages 40. It is particularly desirable that these backs be foldable so that they may be folded on the seats as illustrated at 42 of Figure 5 to the end that the passengers as they move to seats 16 and 18 will have greater freedom of movement, it normally being intended that the side seats will be filled before the center ones.

In order to provide the security and comfort desired for the passengers occupying the center seat it is necessary that the floor between the two center seats 26 and 28 be raised to what would be the normal chair height, the height of the top of seats 26 and 28 regulating the height of their central floor or ramp. This raised floor following the teachings of Figure 4 must not extend under seats 26 and 28 further than is necessary for the security of the center passengers as it will interfere with the foot room of the passengers occupying the lower seats 16 and 18. Floor 44 should preferably be provided with a short ramp or step, the ramp being preferable as illustrated in Figure 2 in which a forward ramp 46 and a rear ramp 48 are provided. The rear ramp 48 would not be required were it not for the desirability of having a rear exit door as 50. Loading is normally accomplished thru the forward doors 52. This is normally all that is required in view of the fact that the passengers are picked up only a few at a time. In unloading however at the destination it is desirable that a rear door as 50 be provided since having two outlets cuts in half the time required for discharging the load and it also provides a measure of safety in case of accident or fire.

It is desired to point out clearly that the longitudinally disposed seats as arranged lend themselves most effectively to the two discharge doors and is a very desirable character of this equipment as it saves so much time in the unloading of the passengers thus making it possible for the vehicle to serve within a given length of time an increased number of patrons. A point in favor of this present equipment is that it provides the maximum seating space that can be obtained in a motor truck of normal dimensions. It means that the motor bus can be kept to the smallest size actually capable of handling the required number of passengers and makes for maximum economy in that passengers can be hauled with lighter equipment without the attendant expense of transporting the dead load of larger and heavier equipment.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

I claim:

1. In a seating arrangement for a passenger vehicle, having a main floor and a central aisle-floor longitudinally disposed above said main floor, the combination with a pair of longitudinally extending seats adjacent the sides of said vehicle, of an intermediate pair of longitudinally extending seats substantially the same altitude above the aisle-floor as the side seats are above the main floor, whereby the knees of the passengers in said side seats may be disposed under said intermediate seats, and located at the sides of said aisle-floor, said intermediate and side seats forming side aisles.

2. In a seating arrangement for a passenger vehicle, having a main floor and a central aisle-floor longitudinally disposed above said main floor, and ramps at the end of said aisle-floor, the combination with a pair of opposed longitudinal seats adjacent the side of the vehicle, of an intermediate pair of longitudinally extending seats substantially the same altitude above the aisle-floor as the side seats are above the main floor, and located at the sides of said aisle-floor, said intermediate and side seats forming side aisles.

JAMES E. WATSON.